March 2, 1943.  J. E. EKLUND  2,312,530
BUNDLE HEADER
Filed July 28, 1941  2 Sheets-Sheet 2
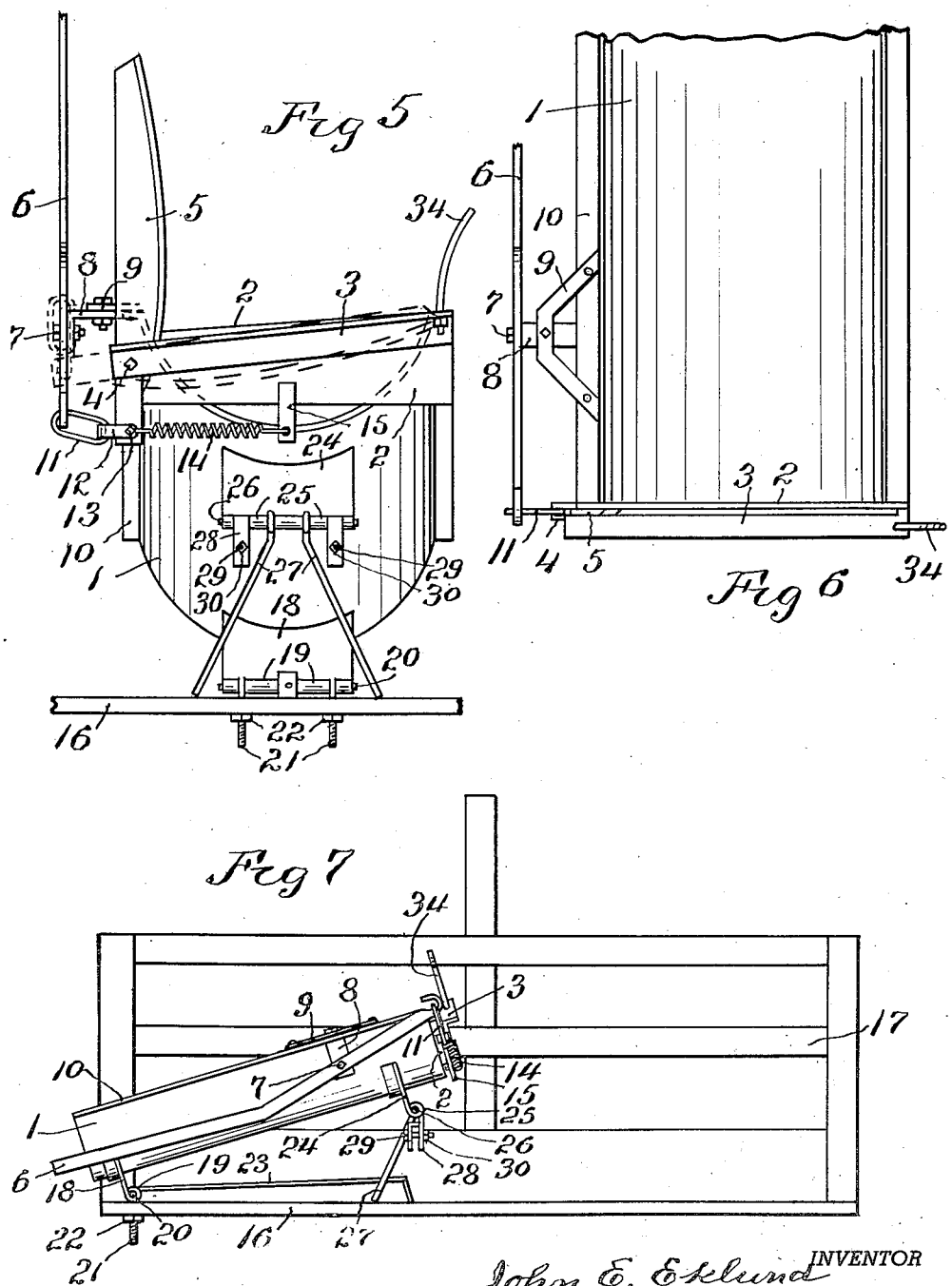
INVENTOR
John E. Eklund
BY Warren D. House
His ATTORNEY Patented Mar. 2, 1943

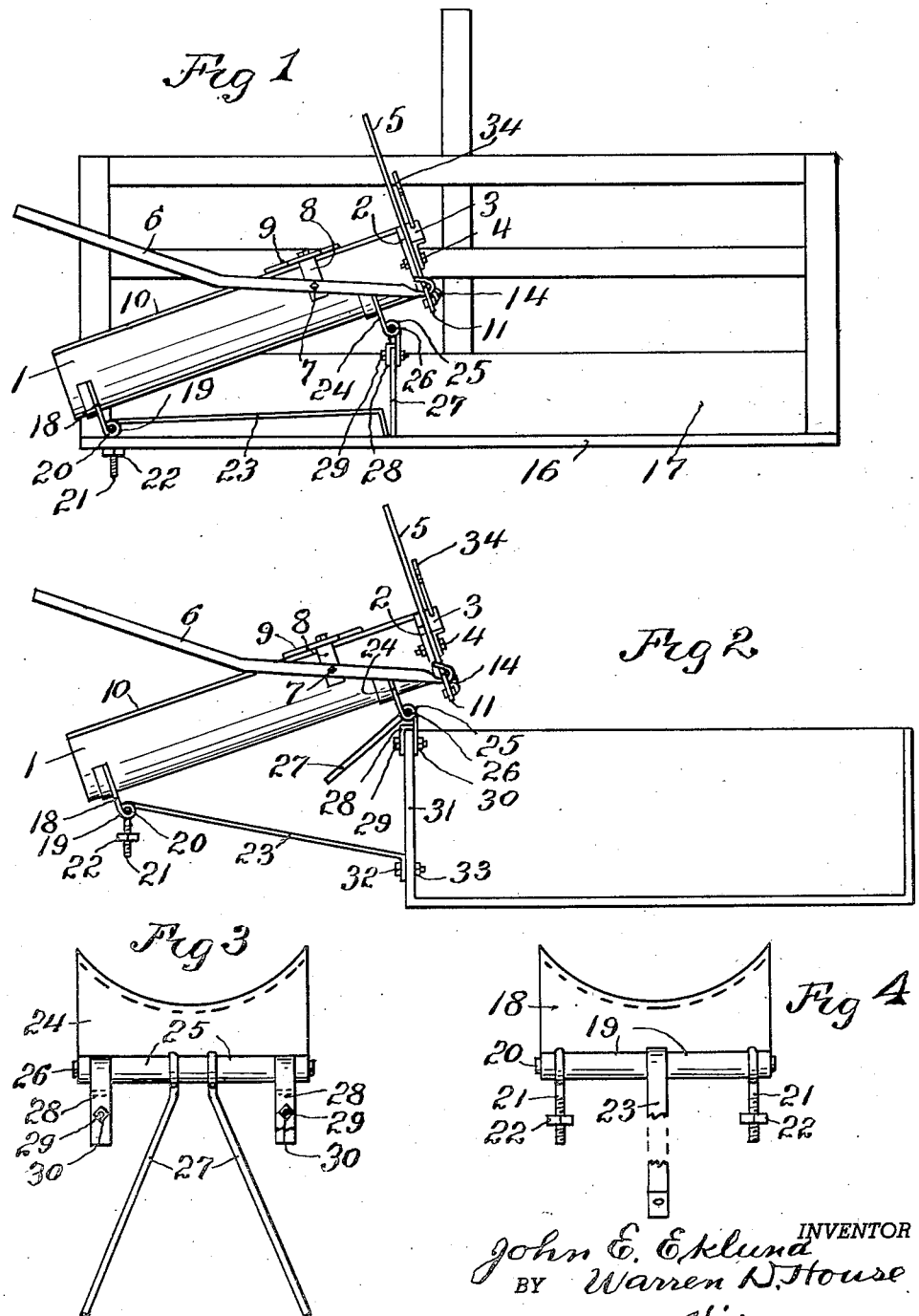

2,312,530

UNITED STATES PATENT OFFICE 2,312,530

BUNDLE HEADER

John E. Eklund, Neosho County, Kans.

Application July 28, 1941, Serial No. 404,267

11 Claims. (Cl. 146—82)

My invention relates to improvements in bundle headers of a type adapted to be mounted on a vehicle, and which has cutting means for severing the heads from bundles of stalks of grain, such as kafir corn, milo maize, sudan grass, or the like.

One of the objects of my invention is the provision of a bundle header of the kind described, which has means for supporting the bundle of stalks, while it is being headed, thus lightening the labor and enabling one person to easily operate the header.

A further object of my invention is to provide a header of the kind described, which has novel means for its attachment to the floor of a hay rack or other vehicle, or to a wall of a vehicle bed, and which attachment can be easily and quickly made.

Still another object of my invention is the provision of a novel header, which is simple in structure, durable, not likely to get out of order, which can be operated by a person standing on the ground, from which the severed stalks can be easily and quickly removed, which deposits the headed grain onto the vehicle, and which is efficient in its operation.

The novel features of my invention are hereinafter fully described and claimed.

In the accompanying drawings, which illustrate my invention,

Fig. 1 is a side elevation of my improved header mounted in operative position on the floor of a vehicle rack, as a hay rack, the hinged blade being shown in upright non-severing position.

Fig. 2 is a view similar to Fig. 1, showing the header mounted in operative position on a side wall of the bed of a vehicle.

Fig. 3 is a rear elevation, enlarged, of the hinge supporting mechanism having the clamps for engaging the wall of a vehicle bed, and the downwardly diverging members for resting on the floor of a vehicle.

Fig. 4 is an enlarged rear elevation of the trough supporting mechanism having the two bolts for attachment to the floor of the vehicle, and having also the hinged brace bar, partly broken away, for attachment to a wall of the vehicle bed.

Fig. 5 is an end elevation of the header shown attached to the floor, partly broken away, of a vehicle, the movable blade being shown in solid lines in the upright position, and in dotted lines in the position it occupies after severing the headed end portions from the stalks.

Fig. 6 is a plan view of the header, partly broken away, the movable blade being shown in the elevated position.

Fig. 7 is a view similar to Fig. 1, but showing the front end of the lever depressed, and the movable blade depressed past the severing position, the two downwardly diverging rods, being shown adjusted to lower the rear end of the trough, to reduce the slant of the trough.

Similar characters of reference designate similar parts in the different views.

1 designates a trough, arcuate in cross section, and having attached to and extending across one end of it a transverse ledger blade 2.

Attached to said end of the trough 1 is a guiding angle bar 3, which is parallel with and spaced a short distance from the ledger blade 2.

Hinged on a bolt 4, extending through the angle bar 3 and engaging the ledger blade 1, is a movable blade 5, having, preferably a convex cutting edge for severing cooperation with the ledger blade 2, the blade 5 being snugly fitted between the ledger blade 2 and the angle bar 3, which holds one side of the movable blade 5 against the adjacent side of the ledger blade 2.

For swinging the movable blade 5 from the upright position, shown in Figs. 1, 2 and 5, into severing cooperation with the ledger blade 2, there is provided a lever 6, pivoted between its ends by a bolt 7 to one arm of an angle plate 8, the other arm of which is fastened to a V shaped bar 9 fastened to the upper side of one of the top flanges 10 of the trough 1.

One end of the lever 6 has attached to it a link 11, which is engaged by a U shaped clip 12, fastened by a bolt 13 extending through the movable blade 5, at the side of the bolt 13 opposite to the cutting edge of the movable blade 5.

The operator standing on the ground pulls down on the other or front end of the lever, thus, through the link 11, clip 12 and bolt 13, swinging the lever 6 into cooperation with the ledger blade 2.

For automatically retracting the movable blade 5 to the upright position, and to swing the front end of the lever 6 upwardly, a coil spring 14 has one end attached to the bolt 13 and its other end attached to a plate 15 fastened to and extending downwardly from the ledger blade 2, Fig. 5.

For hinging the front end of the trough 1 to the floor 16 of a vehicle, as a hay rack 17, there is fastened to and extending downwardly from the bottom of the trough 1, near its forward end, a plate 18, to the lower end of which is fastened by cylindrical portions 19 of the lower end of the plate 18, a transverse horizontal pintle 20, which extends through the eyes at the upper ends of two bolts 21, which extend through the floor 16, the bolts having nuts 22, which bear against the under side of the floor 16.

Pivoted on the pintle 20 is one end of a brace bar 23, which is used when the trough is to be mounted on a wall of a vehicle bed, but which in the present case is idle, and lies extended on the floor 16.

For further pivotally supporting the trough 1 on the floor 16, there is provided a plate 24, similar to the plate 18, which plate 24 is fastened at its upper end to the bottom of the trough adjacent to the end across which extends the ledger blade 2, and which at its lower end has cylindrical portions 25 through which extends a horizontal transverse pintle 26. The pintle extends through two eyes at the upper ends of two downwardly diverging rods 27, the lower ends of which rest on the floor 16.

The length of the rods 27 is such that, when the rods are in the vertical plane, as shown in Fig. 1, the trough 1 will be supported at its greatest adjustable angle from the horizontal, and will incline downwardly and forwardly from the end across which extends the ledger blade 2. By adjusting the rods 27 longitudinally of the trough, as shown in Fig. 7, the inclination of the trough may be lessened, as desired.

On the pintle 26 are also pivoted the upper ends of two inverted U shaped clips 28; through the arms of each clip extends a bolt 29 provided with a nut 30. When the trough is mounted on the floor 16, these clips 28 are idle. They are used when the trough is mounted on a wall of a vehicle bed, as will now be described.

In fastening the trough 1 on a vehicle bed wall 31, Fig. 2, the clips 28 are mounted on the upper edge of the wall 31, which, preferably, is one of the side walls, and the bolts 29 are extended through the wall and the nuts 30 are clamped to the inner side of the wall 31. In such mounting the diverging rods 27 are idle.

The brace bar 23, which is pivoted on the pintle 20, has its other end fastened to the outer side of the wall 31 by a bolt 32 having a nut 33 bearing against the inner side of the wall 31.

Whether attached to the floor 16 of the rack, or attached to the wall 31 of the vehicle bed, the operation of the mechanism is the same.

The operator standing on the ground picks up a bound bundle of grain from a shock and deposits it in the trough 1, with the headed end portions of the stalks extending over and resting on the ledger blade 2 and the angle bar 3. He then pulls down on the adjacent end of the lever 6, thereby swinging the movable blade 5 into severing cooperation with the ledger blade 2; thus severing the head end portions from the stalks. The headed end portions fall on the floor of the vehicle, or into the wagon bed, as the case may be, after which the operator removed the headed stalks and puts another bundle into the trough, thus starting another cycle in the heading operation.

When the operator releases the lever 6, the spring 14 retracts the lever 6 and the movable blade 5 in the manner already described.

The slant forwardly of the trough 1 enables the operator to easily remove the headed stalks.

For holding the stalks from being moved laterally away from the movable blade 5 in the cutting operation, a rod 34 which curves upwardly and outwardly, has its lower end rigidly fastened to the angle bar 3 adjacent to the end thereof distant from the blade 5.

The term "trough," as herein used, is employed in its broadest significance, such as to include any reticular or imperforate channel-like device adapted to support by itself a bundle of stalks, before and during the heading operation, thus relieving the operator of personally effecting such support. The channel form of the stalk support is desirable, as it holds together stalks which are not bound together, but my invention includes such other forms as will, by themselves, support the stalks during the heading operation.

As the upper cutting edge of the ledger blade 2 is disposed substantially in the plane of the top of the trough, as shown in Fig. 5, it permits of quick and easy positioning of a bundle of stalks with the headed end portions in operative positioning for severing.

The operating lever 6 is pivoted, as shown, on an axis transverse to the trough 1, and the lever extends lengthwise of the trough to adjacent the end distant from the ledger blade. This location of the lever enables it to be easily and quickly operated by one person standing on the ground, and who places the bundles in and removes the severed stalks from the trough. The downward slant of the trough from the vehicle aids such removal.

By having the upper side of the trough open for its full length, and the space clear above the ledger blade 2, when the movable blade 5 is in its retracted position at one side of the trough, there is no obstruction preventing the operator, who is on the ground, dropping a bundle sidewise downwardly into the trough and upon the ledger blade 2, where it will be supported while he operates the lever 6 to sever the headed ends, thus relieving him of the strain of supporting the bundle. By having the lower end of the trough open, he can easily remove the severed stalks and deposit them in piles as the vehicle is moved from place to place in the field.

Many modifications of my invention, within the scope of the appended claims, may be made without departing from the spirit of my invention.

What I claim is:

1. In a bundle header, in combination with a vehicle having a bed with a floor, a trough open at its upper side for its full length, a ledger blade extending across one end of said trough and over said floor and against which are adapted to bear the headed end portions of a bundle of stalks placed in said trough, said trough having an open discharge end, a movable blade, means supporting said movable blade on which it may be moved into and out of cooperation with said ledger blade for severing the headed end portions from the stalks, and means for supporting said trough on said vehicle and in a position inclining downwardly from the end across which extends said ledger blade including a clip fastened to said trough and adapted to embrace the upper edge of one wall of the bed of a vehicle, and a bar attached at one end to said trough and having means at its other end for attachment to the outer side of said wall.

2. In a bundle header, in combination with a vehicle having a floor, a trough having an open discharge end, a ledger blade extending across the other end of said trough and over said floor and against which are adapted to bear the headed end portions of a bundle of stalks placed in said trough, a movable blade, means supporting said movable blade on which it may be moved into and out of cooperation with said ledger blade for severing the headed end portions from the stalks, means hinging said trough to the floor of said vehicle, and supporting means on which said trough may be adjusted to different inclinations inclining downwardly from the end of said trough across which extends said ledger blade.

3. In a bundle header, in combination with a vehicle having a floor, a trough having an open discharge end, a ledger blade extending across the other end of said trough and over said floor and against which are adapted to bear the headed end portions of a bundle of stalks placed in said trough, a movable blade, means supporting said movable blade on said trough and upon which it may be moved into and out of cooperation with said ledger blade for severing the headed end portions from the stalks, means for supporting one end of said trough on the floor of said vehicle, and means including two members which diverge downwardly and rest on the floor of the vehicle for supporting the trough at an inclination downward from the end of said trough across which extends said ledger blade and with its lower discharge end projecting outward from said floor.

4. In a bundle header, in combination with a vehicle having a floor, a trough, a ledger blade extending across one end of said trough and over said floor and against which are adapted to bear the headed end portions of a bundle of stalks placed in said trough, a movable blade, means supporting said movable blade on said trough and upon which it may be moved into and out of cooperation with said ledger blade for severing the headed end portions from the stalks, means for hinging said trough to said vehicle, on which it may be swung to a position inclining downwardly from the end across which said ledger blade extends and with its lower discharge end projecting outwardly from the vehicle floor, and means for supporting said trough in said position.

5. In a bundle header, in combination with a vehicle having a floor, a trough, a ledger blade above said floor and extending across one end of said trough and against which are adapted to bear the headed end portions of a bundle of stalks placed in said trough, a movable blade, means supporting said movable blade on which said movable blade may be moved into and out of cooperation with said ledger blade for severing the headed end portions from the stalks, means including a lever for moving said movable blade into said cooperation, means for retracting said movable blade automatically from said cooperation, and means for supporting said trough on said vehicle in a position inclining downwardly from the end across which extends said ledger blade.

6. In a bundle header, in combination with a vehicle having a floor, a trough, a ledger blade over said floor and extending across one end of said trough and against which are adapted to bear the headed end portions of a bundle of stalks placed in said trough, a movable blade, means hinging said movable blade to said trough on which it may be swung into and out of cooperation with said ledger blade, means, including a lever for swinging said hinged blade into said cooperation, automatic means for retracting said hinged blade from said cooperation, and means for fastening said trough to said vehicle in a position inclining downwardly from the end across which extends said ledger blade.

7. In a bundle header, in combination with a vehicle having a bed having a floor, a trough, a ledger blade over said floor and extending across one end of said trough and against which are adapted to bear the headed end portions of a bundle of stalks placed in said trough, a movable blade, means supporting said movable blade on said trough, means for moving said movable blade into and out of cooperation with said ledger blade for severing the headed end portions from the stalks, means for supporting said trough on the upper edge of the bed of said vehicle, and bracing means releasably attachable to the bed for aiding in the support of said trough.

8. In a bundle header, in combination with a vehicle having a bed having a floor, a trough, a ledger blade over said floor and extending across one end of said trough with its cutting edge above the bottom of said trough and against which are adapted to bear the headed end portions of a bundle of stalks placed in said trough, a movable blade, means supporting said movable blade on said trough, means for moving said movable blade into cooperation with said ledger blade for severing the headed end portions from the stalks, and means for supporting said trough on one wall of the bed of said vehicle in a position inclining downwardly from the end across which extends said ledger blade.

9. A bundle heading mechanism comprising a vehicle having a floor, an inclined trough open at its upper side for its full length with its upper end above said floor and having an open lower discharge end projecting from said vehicle, means for severing transversely across the upper end of said trough stalks deposited lengthwise in said trough with their headed ends projecting from the upper end of said trough over said floor, and means for fastening said trough, so positioned, on said vehicle.

10. A bundle heading mechanism comprising a vehicle provided with a wall and a floor, an inclined trough open at its upper side for its full length with its upper end over said floor and extending across said wall and having a lower open discharge end projecting outwardly from said wall, means for severing transversely across the upper end of said trough stalks deposited lengthwise in said trough with their headed ends projecting over said floor and means for supporting said trough, so supported, on said wall.

11. A bundle heading mechanism comprising a vehicle having a floor, an inclined trough open at its upper side for its full length with its upper end over said floor and having an open lower discharge end projecting outwardly from said vehicle, means for severing transversely across the upper end of said trough stalks deposited lengthwise in said trough with their headed ends projecting from the upper end of said trough over said floor, and means for fastening said trough, so supported, on said floor.

JOHN E. EKLUND.